No. 612,193. Patented Oct. 11, 1898.
E. L. CLAUS.
BICYCLE HANDLE BAR.
(Application filed Dec. 21, 1896.)
(No Model.)
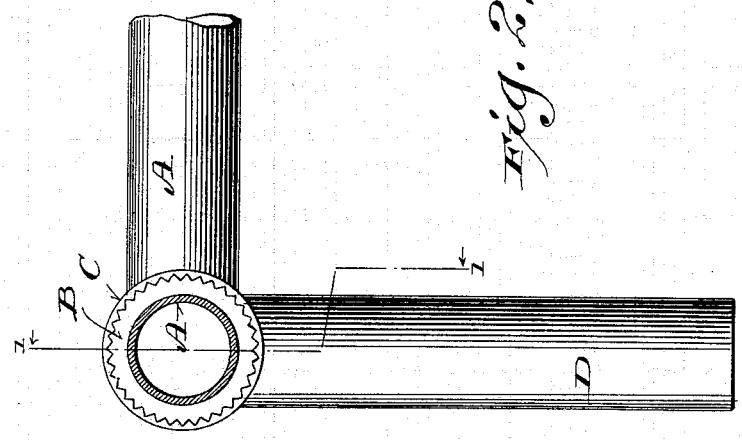
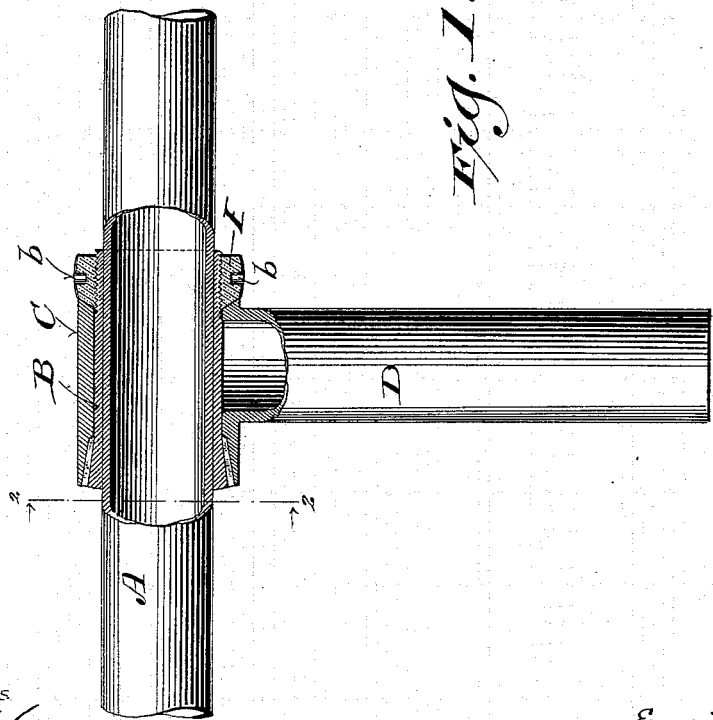
WITNESSES
Geo. W. Young.
N. E. Oliphant
INVENTOR,
Emil L. Claus
BY
H. G. Underwood
ATTORNEY.

UNITED STATES PATENT OFFICE.

EMIL L. CLAUS, OF MILWAUKEE, WISCONSIN, ASSIGNOR TO THE CLAUS HANDLE-BAR COMPANY, OF SAME PLACE.

BICYCLE HANDLE-BAR.

SPECIFICATION forming part of Letters Patent No. 612,193, dated October 11, 1898.

Application filed December 21, 1896. Serial No. 616,411. (No model.)

*To all whom it may concern:*

Be it known that I, EMIL L. CLAUS, a citizen of the United States, and a resident of Milwaukee, in the county of Milwaukee and State of Wisconsin, have invented certain new and useful Improvements in Bicycle Handle-Bars; and I do hereby declare that the following is a full, clear, and exact description thereof.

My invention contemplates a simple, economical, strong, and durable construction and arrangement of parts embodying a bicycle handle-bar, whereby the latter may be readily adjusted to vary the elevation of its ends or grips and rigidly secured in adjusted position, said invention being hereinafter more fully set forth with reference to the accompanying drawings and subsequently claimed.

Figure 1 of the drawings represents a construction and arrangement of parts in accordance with my invention, the view being a rear elevation, partly in section, on line 1 1 in the succeeding figure; and Fig. 2, a side elevation, partly in section, on line 2 2 in the preceding figure.

Referring by letter to the drawings, A represents a portion of a bicycle handle-bar shaped from a section of metal tubing, as is usual in the art. Brazed or otherwise rigidly secured to the middle portion of the bar is a sleeve B, having a diametrically-enlarged end thereof longitudinally corrugated upon its exterior, the other end of this sleeve being provided with an external screw-thread. It is preferable to have the corrugations of the sleeve on a bevel, and to obtain this result said sleeve may have its corrugated portion gradually thickened in an outward direction, as herein shown. The sleeve engages a tubular head C, and this head is provided with a depending shank D for connection with the steering-fork shank of a bicycle. One end of the head C is interiorly shaped to match the corrugated portion of the sleeve B, and a nut E engages with the screw-threaded end of said sleeve against said tubular head, the opposing surfaces of the nut and head being preferably beveled, as is also herein shown. The nut being run off the sleeve, the handle-bar may be moved in a direction to bring its corrugated portion out of engagement with the corrugations of the tubular head and permit rotary adjustment of the handle-bar for the purpose hereinbefore set forth. The corrugated portion of the sleeve being again engaged with the corrugations in the tubular head and the nut run onto said sleeve against said head, the handle-bar will be securely locked in its adjusted position.

By having the corrugations of the sleeve and tubular head on a bevel, as is herein shown to be the preferable construction, a wedging fit is had when the nut is tightened, and thus the handle-bar is rigidly held in its adjusted position. By having the opposing ends of the tubular head and nut beveled the latter will wedge into said head and be less liable to work loose.

The nut is preferably round and may be milled on its periphery, as herein shown, so as to facilitate its operation by hand, and said nut is also shown provided with recesses *b* for the engagement of a spanner-wrench or other convenient tool by which it may be rotated on the screw-threaded end of the handle-bar sleeve.

While it is preferable to have the corrugated portions of the handle-bar sleeve and shank-head beveled, as herein shown, it is practical to make them straight, and in either case the ridges of the sleeve-corrugations fitting the depressions of the head-corrugations will have their inner ends stopped by non-corrugated portion of said head to thus limit longitudinal movement of the handle-bar in one direction, the nut operating to prevent like movement of said handle-bar in the opposite direction whether the opposing surfaces of said nut and shank-head be beveled or otherwise.

Having thus described my invention, what I claim as new, and desire to secure by Letters Patent, is—

1. A tubular head for connection with the steering-fork shank of a bicycle and having one end thereof longitudinally corrugated upon its interior, a handle-bar having its middle portion provided with a rigid sleeve externally screw-threaded at one end and having its other end diametrically enlarged and corrugated to match the corrugations in the head, and a nut run on the screw-threaded end of said sleeve against said head.

2. A tubular head for connection with a steering-fork shank of a bicycle and having an interiorly-beveled and longitudinally-corrugated end, a handle-bar having its middle portion provided with a rigid externally-screw-threaded sleeve beveled and corrugated to interlock with the head, and a nut engageable with the screw-thread on the sleeve against said head.

3. A tubular head for connection with the steering-fork shank of a bicycle and having one end thereof longitudinally corrugated upon its interior, and the other end beveled, a handle-bar having its middle portion provided with a rigid sleeve externally screw-threaded at one end and having its other end diametrically enlarged and corrugated to match the corrugations in the sleeve, and a nut run on the screw-threaded end of said sleeve, the inner end of this nut being beveled to wedge against the opposing beveled end of said head.

4. A tubular head for connection with a steering-fork shank of a bicycle and having an interiorly-beveled and corrugated end, the other end being also beveled; a handle-bar having its middle portion provided with a rigid externally-screw-threaded sleeve beveled and corrugated to interlock with the head, and a bevel end nut engageable with the screw-thread on the sleeve to have wedging fit against the adjacent beveled end of said head.

5. A bicycle handle-bar having its central portion provided with longitudinal corrugations and a screw-thread, a tubular supporting-head having match fit on the corrugated portion of the bar, and a nut that is run on said screw-thread to bind against the end of the supporting-head farthest from the corrugations of the joint.

6. A bicycle handle-bar having its central portion provided with beveled corrugations in a longitudinal direction and a screw-thread, a tubular head having match fit on the corrugated portion of the bar, and a bevel end nut that is run on said screw-thread against a corresponding bevel at the end of the supporting-head farthest from the corrugations of the joint.

7. In combination, the handle-bar, an annular enlargement thereon provided with longitudinally-extending teeth or corrugations, the hollow cross-head adapted to inclose said enlargement, an annular internal abutment carried thereby having longitudinal teeth or corrugations and means for holding the same into engagement with the said enlargement.

8. The combination with a handle-bar stem having an eye provided upon its inner surface with a series of tapering corrugations or teeth, of a longitudinally-movable and revoluble handle-bar provided also with a series of tapering corrugations or teeth adapted to mesh with those of the eye, and locking means for preserving such engagement.

In testimony that I claim the foregoing I have hereunto set my hand, at Milwaukee, in the county of Milwaukee and State of Wisconsin, in the presence of two witnesses.

EMIL L. CLAUS.

Witnesses:
N. E. OLIPHANT,
B. C. ROLOFF.